Nov. 10, 1931.  P. E. FENTON  1,831,295
SNAP FASTENER
Filed Sept. 11, 1928
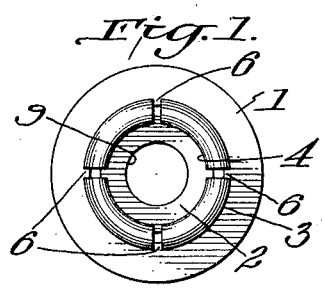
Fig. 1.
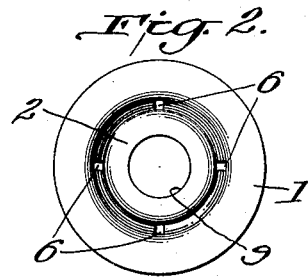
Fig. 2.
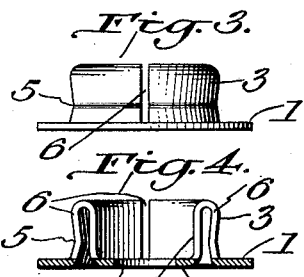
Fig. 3.
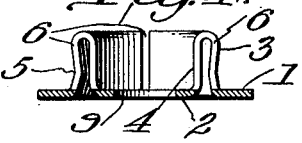
Fig. 4.
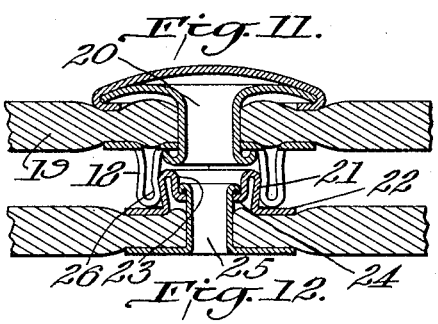
Fig. 11.
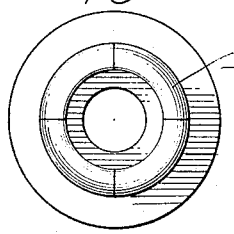
Fig. 12.
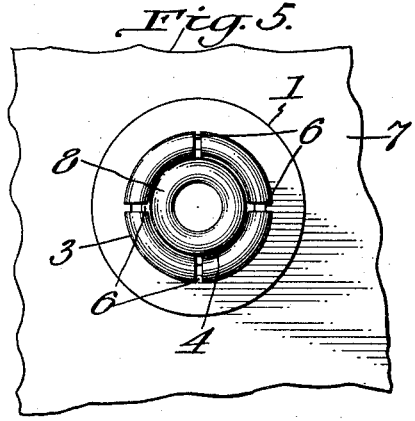
Fig. 5.
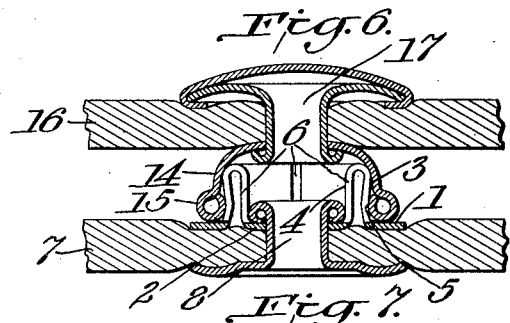
Fig. 6.
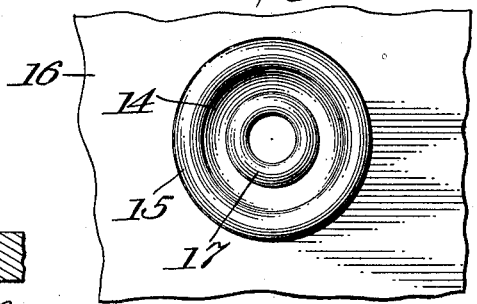
Fig. 7.
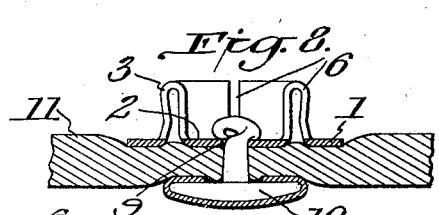
Fig. 8.
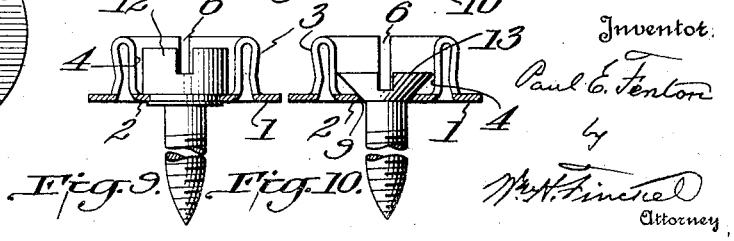
Fig. 9.  Fig. 10.
Inventor:
Paul E. Fenton
by
W. H. Finckel
Attorney Patented Nov. 10, 1931

1,831,295

UNITED STATES PATENT OFFICE

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT

SNAP FASTENER

Application filed September 11, 1928. Serial No. 305,191.

The object of this invention is to provide a resilient member of a snap fastener couple, which is made of one piece and very sturdy and long-lived.

The invention consists of a one-piece snap fastener member, having an outer solid rim and an inner solid rim, which latter is provided with a hole to receive an attaching member, the material between these two rims being raised in the form of an outer and an inner wall spaced apart and substantially parallel, one of the walls being bulged and the other wall being substantially straight throughout its length, both of which walls are slotted down to but short of the two rims, the resilience of the device residing in the slotted walls, as I will proceed now to explain more fully and finally claim.

In the accompanying drawings illustrating the invention, in the several figures of which like parts are similarly designated, Figure 1 is a top plan view; Fig. 2 is a bottom plan view; Fig. 3 is a side elevation, and Fig. 4 is a vertical cross section of one form of one member of a snap fastener embodying the features of this invention. Fig. 5 is a top plan view of the resilient member of a snap fastener set upon a piece of fabric. Fig. 6 is a vertical section of the complemental members of the snap fastener, united as in use, the head or stud member embodying the features of this invention. Fig. 7 is a bottom plan view of a non-resilient socket member, such as shown in Fig. 6. Fig. 8 is a vertical section of the resilient head or stud member secured to a piece of fabric by means of a tack, instead of by means of an eyelet or post as shown in Fig. 6. Figs. 9 and 10 illustrate in cross section, the same form of resilient head or stud adapted to be set in position respectively by a cap screw and a wood screw, it being understood that metal screws may be used where the part is to be secured to a metal support. Fig. 11 is a vertical section illustrating the invention as applied to a socket member for cooperation with a non-resilient head or stud, these parts being united as in use. Fig. 12 is a plan view that applies equally well to a resilient head or stud or a socket made in accordance with the present invention.

As already indicated, the present invention is applicable alike to the head or stud member and the socket member of a snap fastener.

As shown in Figs. 1 to 6, inclusive, and Figs. 8, 9 and 10, the resilient head or stud is made of a single piece of metal, with an unbroken or solid outer rim 1, and an unbroken or solid inner rim 2, the metal between these two rims and connecting them projecting from them and forming an outer wall 3 and an inner wall 4, the tops of which are curved and the upper portion of the outer wall being bulged outwardly, as shown particularly in Figs. 3, 4, 6, 8, 9 and 10, so as to present a neck portion 5 of smaller diameter than the external diameter of the upper portion of the wall, in order to more effectively engage the complemental member of the snap fastener. The two walls 3 and 4 are slotted longitudinally, as indicated at 6, any number of such slots being used, four being shown. The slots of the walls extend down to and just short of the upper level of the rims 1 and 2, so that the device presents two rigid and non-resilient rims arranged in substantially the same plane and from which rise two walls which are resilient.

As shown in Fig. 6, the resilient head or stud may be secured to an article, represented at 7, by means of an eyelet or hollow post 8, the barrel of which is passed up through a hole in the article, 7, and through a hole 9 in the inner rim 2 and clinched. Instead of a hollow post or eyelet being used for setting the device, the head or stud may be secured by means of a tack 10, Fig. 8, the point of which is driven through the article 11 and a hole, such as 9, in the inner rim 2 and clinched. Or if the head or stud is to be secured to a fixed part or support, then a capscrew 12 may be used, as shown in Fig. 9, or a wood screw 13 may be used, as shown in Fig. 10.

As shown in Fig. 6, the complemental member or socket for use in connection with a resilient head or stud, may comprise a single inverted cup-shaped piece 14, having the rolled or otherwise reinforced rim 15, which becomes the active element of the socket for its engagement with the head or stud. This part 14 may be secured to an article 16 by means of the headed or capped eyelet 17, the barrel of which is passed through a hole in the article 16 and a hole in the member 14 and clinched in the latter.

The resilient one-piece member having substantially the same construction as that previously described, may be used as a socket member, 18, as shown in Fig. 11, the same being secured to an object 19 by means of a capped eyelet 20, the barrel of which is passed through a hole in the object 19 and the hole in the inner rim of the resilient member and clinched in the latter. In this case the stud member 21, may be rigid or non-resilient and of any construction suitable for cooperation with the socket member, the same being shown as a one-piece structure, having the outer rim 22, the outwardly flared walls 23 and the perforated inner rim 24, which is engaged by the post 25. I have said that such a socket member may be substantially identical in construction with the previously described head or stud member but it is to be noted that the bulged wall 26 is the inner wall, instead of the outer wall, and it is inwardly bulged for co-operation with the head or stud. In the head or stud shown in Fig. 11 the inner rim 24 is in a plane above the plane of the outer rim 22.

In all of the illustrated forms of the invention, the slotting of the walls does not extend into the outer rim or the inner rim, and the resilience, therefore, of the walls is stiff, resulting in a very sturdy and long-lived action under the strains and stresses of use. In furtherance of such resilience the slotted walls are spaced apart and substantially parallel and while one of said walls is bulged the other is substantially straight throughout its length.

As already stated, the slotting of the walls leaves a solid rim around the outside, which furnishes a support for the outer wall and also a solid rim in the center which furnishes a support for the inner wall, as well as provides means for attaching or setting the device.

The construction, also, is economical to manufacture, being in one piece, and is sturdy because the inner wall acts as an auxiliary unit to the outer wall in providing a long-lived snap action; and it also provides a support for the outer resilient wall which prevents crushing under the damaging effects of laundering.

The construction shown in Figs. 11 and 12, where the device is illustrated as a resilient socket member for use in connection with a non-resilient head or stud member, forms the subject of my separate concurrent application of even date herewith, Serial No 305,192, the broad invention therein illustrated being claimed herein, while the specific invention is claimed in the separate application mentioned.

Variations in the details of construction are permissible within the principle of the invention and the scope of the claims following.

What I claim is:—

1. A resilient fastener member, having a solid unbroken outer rim and a solid unbroken inner rim, an outer wall extending from the outer rim and an inner wall extending from the inner rim, the two walls being integral with one another and with the outer and inner rims and slotted continuously throughout their lengths substantially down to and short of the two rims, said outer and inner walls being spaced apart and substantially parallel, the parts being of single unitary structure, only one of the walls being bulged to engage the complemental fastener member and the other being substantially straight throughout its length, and the inner rim provided with a hole for the reception of an attaching device.

2. A resilient snap fastener stud, having a solid unbroken outer rim and a solid unbroken inner rim arranged in the same plane, and an intermediate double wall projecting from adjacent edges of these rims, said double wall composed of two substantially parallel parts spaced apart, one of such parts being bulged to engage a complemental socket member and the other part being substantially straight throughout its length and both of said parts being slotted in the direction of the rims, said slots terminating short of the rims, the parts being of a single unitary piece bent to shape, and the inner rim provided with a hole adapted to receive and be engaged by an attaching device.

3. A snap fastener stud, having a solid unbroken outer rim and a solid unbroken inner rim, an outstanding outer wall rising from the outer rim and an outstanding inner wall rising from the inner rim integral with one another and with the outer and inner rims, said walls being spaced apart and substantially parallel and slotted continuously throughout their lengths substantially down to and short of the two rims, the parts being of single unitary structure, one of the said walls being bulged to engage the complemental fastener member and the other wall being substantially straight throughout its length, and the inner rim provided with a hole for the reception of an attaching device.

In testimony whereof I have hereunto set my hand this 10th day of September A. D. 1928.

PAUL E. FENTON.